United States Patent [19]

Coppens et al.

[11] Patent Number: 4,883,722

[45] Date of Patent: Nov. 28, 1989

[54] BRASS-COATED STEEL ELEMENTS HAVING IMPROVED RUBBER ADHESION PROPERTIES

[75] Inventors: Wilfried Coppens, Kortrijk; Daniël Chambaere, Wevelgem; Hugo Lievens, Gent, all of Belgium

[73] Assignee: N.V. Bekaert S.A., Zwevegem, Belgium

[21] Appl. No.: 60,634

[22] Filed: Jun. 11, 1987

[30] Foreign Application Priority Data

Jun. 27, 1986 [GB] United Kingdom ................ 8615746

[51] Int. Cl.⁴ .......................... B32B 15/06; B60C 9/00
[52] U.S. Cl. ...................................... 428/625; 428/677; 428/328; 428/369; 152/565
[58] Field of Search .................... 428/677, 625; 72/47; 152/565, 451; 57/902; 156/124; 427/327, 328, 401, 355, 356, 357, 358, 367, 369, 383.7, 370

[56] References Cited

U.S. PATENT DOCUMENTS

| | | | |
|---|---|---|---|
| 2,233,422 | 3/1941 | Lodeesen | 148/6 |
| 3,996,074 | 12/1976 | Rakestraw et al. | 152/565 |
| 4,182,639 | 1/1980 | Pignocco et al. | 428/677 |
| 4,218,517 | 8/1980 | Van Doij | 428/625 |
| 4,269,877 | 5/1981 | Shemenski, Sr. | 427/327 |
| 4,347,290 | 8/1982 | Haemers | 428/625 |
| 4,446,198 | 5/1984 | Shemenski et al. | 428/677 |
| 4,627,229 | 12/1986 | Borgois | 57/902 |
| 4,645,718 | 2/1987 | Dombre | 428/625 |
| 4,677,033 | 6/1987 | Coppeno et al. | 428/677 |

FOREIGN PATENT DOCUMENTS

0169047 1/1986 European Pat. Off. .
1007909 5/1952 France .

OTHER PUBLICATIONS

Owen et al., "Copper Pyrosphosphate Plating Without Additives", Plating, Jul. 1967, pp. 821–825.
Young, C. B. F., "The Deposition of Copper from Phosphoric Acid Solutions", Metal Finishing, Nov. 1949, pp. 56–59.

*Primary Examiner*—John J. Zimmerman
*Attorney, Agent, or Firm*—Foley & Lardner, Schwartz, Jeffery, Schwaab, Mack, Blumenthal & Evans

[57] ABSTRACT

A brass alloy coating is disclosed which is of use in the manufacture of steel reinforced rubber articles, particularly tires. The alloy contains small amounts of phosphorus, particularly phosphates, and the adhesion between the rubber and brass is thereby improved, especially under high humidity and/or high temperature conditions.

17 Claims, 1 Drawing Sheet

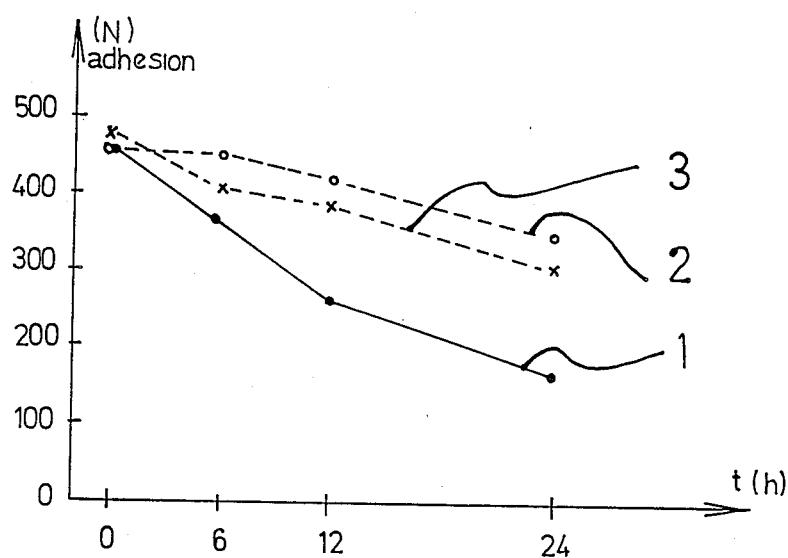
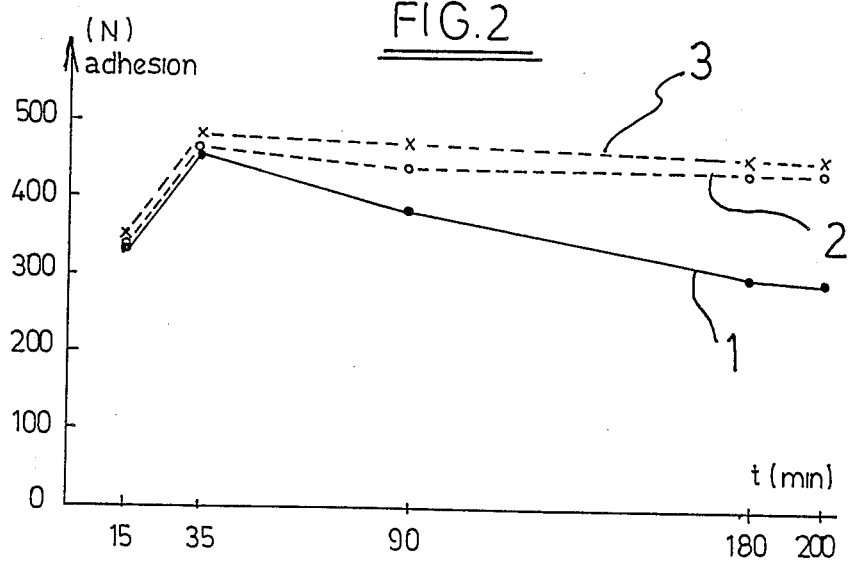

BRASS-COATED STEEL ELEMENTS HAVING IMPROVED RUBBER ADHESION PROPERTIES

BACKGROUND

1. Field of the Invention

The present invention relates to brass coated steel elements for use in the reinforcement of vulcanized rubber articles and in particular to brass-coated steel wire and cord elements having improved, durable adhesion properties for use in high-performance rubber applications such as steel-belt reinforced pneumatic vehicle tires.

2. Related Art

Brass-coated steel reinforcements for use in vulcanized rubber articles include single filaments, steel cords, strands of twisted or parallel wires and other wire products (e.g. wire fabrics), strips, flattened or otherwise shaped wires, etc. The term "element" is intended to include all possible forms of such reinforcements. The steels used are generally carbon and high-carbon steels, i.e. alloys which owe their properties chiefly to the presence of carbon. The carbon content may vary from about 0.1 % to up to more than 1 %, a usual range for tire cord application being 0.6 to 0.8 %. The term "brass" includes rubber adherable Cu-Zn alloy compositions which contain at least 55% of copper, more usually alpha-brass ranging from about 60 to 75 % Cu, the remainder being essentially zinc (and optionally minor amounts of other alloying elements, such as Co, Ni, etc.).

The present invention is particularly concerned with the problem of ensuring adequate adhesion retention, over extended periods of use, between brass-coated steel elements and the vulcanized rubber in which such reinforcing elements are incorporated, more especially between brass-coated steel tire cord and tire rubber wherein the embedded cord is frequently subjected to severe ageing under high humidity and/or high temperature conditions.

The problem of adhesion degradation during tire operation is known to arise frequently and to a variable extent when steelbelted vehicle tires are exposed to more or less severe driving conditions, involving humidity and/or heat ageing effects stemming from the presence of moisture in the rubber (e.g. due to water penetration or permeation) and high operating temperatures. As a consequence, initial or originally cured adhesive bond strength between brass-coated steel cord and tire rubber will decrease with time, sometimes very rapidly (accelerated ageing) due to high heat and humidity ageing (often in combination with chemical degradation and corrosion effects). This deterioration in adhesion weakens the structural integrity of the cord/rubber composite, and ultimately the tire may tend to come apart by cord/rubber debonding.

Consequently, it is important to maintain a high level of adhesion throughout the service life of the vulcanized rubber product.

Many ways of protecting brass coated tire cord and of improving adhesion properties have been investigated and numerous methods have been proposed in the recent past. Various improvements are directed to increased surface protection of the steel substrate and of the brass coating, mainly through treatment of the wire and/or brass surface with anticorrosive agents or by applying a protective top layer or undercoating layer on to the brass. Other proposals involve alloy modifications of the brass composition and yet others the adaptation of the rubber compound with specific adhesion promotors and the like. Proposals thus include dipping the cord in specified mineral oil solutions, vapour treatment of the cord surface, precoating the brassed cords with rubber or with certain ingredients of the rubber wire and numerous similar treatments with various chemical compositions (e.g. benzotriazole, carboxylic acids, and salts thereof, borates, etc.).

Although the afore-mentioned proposals may result in an increased stability of the adhesive bond against corrosive attack, it has been acknowledged that they have not solved entirely the persistent problem of substantial adhesion loss in steel cord reinforced tires under conditions of high humidity and heat ageing. Moreover, many of the above proposals appear to be less practical from a technical and economical point of view.

Objects and Summary

Accordingly, it is an object of the present invention to overcome the difficulties and drawbacks referred to above and to provide improved brass coated steel elements which can be readily produced, which have satisfactory adhesion properties when incorporated into vulcanized rubber products and which in particular provide a means of achieving adequate adhesion retention when used in demanding conditions.

Another object is to provide a novel brass composition for use as a rubber adherent coating on steel elements to be incorporated in rubber articles such as vehicle tires, ensuring a more durable brass-rubber adhesive bond during the lifetime of the steel/rubber composite.

A further object is to provide a method of increasing the resistance of the brass-rubber bond in brass-coated steel/rubber vulcanizates to rapid degradation caused by heat and the presence of moisture.

A still further object is to provide brass-coated steel elements for use as tire reinforcements which retain a high adhesion level during tire operations when subjected to severe heat and humidity conditions such as simulated by steam ageing and overcure heat ageing.

A yet still further object is to provide high-durable rubber products, in particular vehicle tires, containing improved steel element reinforcements.

These and other objects and advantages of the present invention will become more apparent to those skilled in the art from the detailed description, figures and working examples hereinafter.

The present invention is based on the surprising finding that the normal relatively steep fall in rubber adhesion strength of conventional brass-coated steel reinforcing elements under severe humidity and heat ageing conditions (exemplified by steam ageing) can be retarded to a considerable degree when such reinforcing elements are coated with a rubber-adherent brass composition containing phosphorus, in particular when phosphorus is present as a phosphate in the brass coating.

According to one feature of the present invention, there is thus provided a rubber adherable steel reinforcing element having a brass alloy coating with a copper content of at least 55%, characterized in that the brass alloy contains phosphorus in an amount of more than 4 milligrams per square meter of coating surface, said P-content being expressed as a weight content of phosphate ions as measured by the Standard Test herein described and serving to provide an enhanced adhesion to vulcanized rubber products upon heat and/or humidity ageing.

The steel elements according to the invention are advantageously in the form of steel wires (which preferably have a diameter of not more than 0.5 mm, a tensile strength of at least 2500N/mm$^2$ and a brass alloy coating having a thickness of from 0.10 to 0.40 micrometer) and steel cords for use as tire reinforcing elements comprising a plurality of such steel wires, preferably having a diameter of between 0.1 and 0.4 mm and a tensile strength of at least 2700N/m$^2$.

According to a further feature of the present invention, there is provided a method of producing steel reinforcing elements in the form of steel wire which comprises applying a brass alloy coating with a copper content of at least 55% to the surface of a steel wire, characterized in that phosphorus is incorporated into the brass alloy coating in an amount of more than 4 milligrams per square meter of coating surface expressed as a weight content of phosphate ion as measured by the Standard Test herein described.

According to a still further feature of the present invention, there is provided vulcanized rubber articles containing as reinforcement steel elements according to the invention as hereinbefore defined or steel elements as produced by a method according to the invention as hereinbefore defined. Rubber tires containing steel cords as hereinbefore defined constitute a particularly important embodiment of the present invention.

According to a yet still further feature of the present invention, there is provided a method of producing vulcanized rubber articles containing steel reinforcing elements in which unvulcanized rubber is vulcanized in contact with steel reinforcing elements whereby bonding between the vulcanized rubber and the steel reinforcing elements is effected, characterized in that the steel reinforcing elements used are in accordance with the invention as hereinbefore defined or are as produced by a method of the invention as hereinbefore defined.

From investigations on numerous test coatings applied to different wires or cords and bonded to various rubbers, it has been possible to specify a minimum phosphate content of 4 mg per square meter or brassed surface as measured by the Standard Test hereinafter described, below which minimum the improvement in aged adhesion retention is generally poor or less consistent. For example, between 3 and 4 mg phosphate per m$^2$ there may be a certain improvement, but this is less controllable and frequently affected by minor surface contaminants (including even incidental P-containing substances, stemming from wire and cord processing aids). Above this minimum amount of 4 mg phosphate per m$^2$ of brass coating one in general obtains a substantial increase in adhesion strength under high humidity/heat ageing conditions. This improvement is observed in a broad range of P-containing brasses and increasingly so with rising phosphate content which may attain a level of up to more than 40 mg/m$^2$. (For convenience, all concentrations in this specification are expressed in mg/m$^2$ as measured by the Standard Test).

Above, an upper phosphate limit of about 50 mg/mm$^2$, it has however been found that difficulties may sometimes arise. For example it may become harder to fulfil a requirement of sufficient initial adhesion with certain rubber compounds (owing to a too large reduction in adhesion build up rate in normal vulcanization conditions) and also the wet drawing operation frequently requires greater care. Thus it is preferred that the phosphate content be less than 50 mg/m$^2$.

BRIEF DESCRIPTION OF THE DRAWINGS

The advantages and the improved aged adhesion properties obtainable by the present invention are illustrated graphs shown in the by the drawings of FIGS. 1 and 2.

DETAILED DESCRIPTION OF THE INVENTION

Referring to FIG. 1, there is shown the evolution of cord/rubber rubber adhesion strength with steam ageing time t, respectively for conventionally produced cords: solid line (1) and for two different cords according to the invention: broke lines (2) and (3). The adhesion strength in ordinate is expressed in terms of forces (N) necessary to pull out cords embedded in rubber blocks with a predetermined embedment length (ASTM test 2630). Steam ageing time t in hours is shown in abscis.

FIG. 2 compares adhesion build up with curing time t (min.) and the effect of overcure on adhesion loss for the same conventional cords: solid line (1) and for the respective cords as in FIG. 1 and according to the invention: broken lines (2) and (3).

It is apparent from FIG. 1 that very significant increases in aged adhesion retention are obtainable with cords according to the invention which are coated with a brass layer of the usual Cu-Zn composition (here about 63–65 % Cu) except that the brass has a phosphate content of about 9 to 12 mg/m$^2$.

From FIG. 2 it is clear that cords according to the invention are similar to conventional brassed cords in adhesion build up, but are clearly superior in overcure resistance (prolonged heat ageing at 155° C.).

Accordingly, the objects of the present invention are accomplished by providing a steel element (usually wire filaments and cords) for use in the reinforcement of vulcanized rubber products such as tires, hoses, straps, belts and the like, which element is covered with a phosphorized brass alloy coating having a copper content of at least 55 % by weight (more usually 60 to 75 % Cu), the said brass coating having generally a substantially homogeneous Cu-Zn alloy base composition and structure comprising an average phosphorus content of at least 4 milligrams per square meter of coating surface, the P-content being expressed as an amount by weight of phosphate ion ($PO_4^{3-}$) as measured by the Standard Test hereinafter described.

The phosphorus content of the improved brass coating will preferably be not less than 5 mg/per m$^2$ and not more than 50 mg/m$^2$, and preferably be comprised in the range of from 6 to 40 mg/m$^2$ still more preferably from 8 to 30 mg/m$^2$ and most preferably from 10 to 25 mg $PO_4^{3-}$ per m$^2$. The phosphorus is preferably, but not necessarily, evenly distributed in the brass layer. It may be more concentrated in the upper part of the coating thickness, provided the average P-amount is not less than a specified lower limit as mentioned above. According to a particularly advantageous embodiment of the present invention, the P-amount in the brass coating is essentially present in the form of phosphate ions ($PO_4^{3-}$), conveniently but not necessarily of the constituent metals (i.e. copper and zinc) of the brass alloy base. Other suitable phosphates include for example pyrophosphates. In addition, phosphates of iron (stemming from the steel substrate or otherwise introduced to the brass alloy) and phosphates of optional brass alloying elements (e.g. Mn or Co or Ni) are not excluded. Further, P-alloyed brass coatings wherein phosphorus is present as a solute, or as a suitable non-phosphate phosphorus compound are envisaged. Such P-containing rubber adherent brass coatings, applied on steel filaments and tire cords, are all included within the scope of the present invention, provided their average P-content, expressed as $PO_4$-ion amount, is not lower than 4 mg per $m^2$ of brassed surface.

It is believed that the unexpected significant improvement in aged adhesion retention achievable in cord/rubber composites by applying a specified P-containing brass deposit on steel elements according to this invention (in particular when the phosphorus is present as a phosphate, intimately distributed in the brass coating) is associated with a substantial reduction in overcure and/or postvulcanization reaction rate between the brass coating and the rubber, more especially in the presence of heat and humidity. It is generally known that a gradual adhesion degradation normally occurring in tire service is accelerated by heat and humidity, frequently to such an excessive extent that premature cord/rubber debonding precludes further tire usage. This is commonly thought to arise from abnormal growth of a cuprous sulphide phase in the interface layer (rendering the adhesion layer friable and more prone to debonding) or from the formation of other undesirable reaction products (hydro-oxides, sulphides or copper and zinc, corrosion products etc.) between the rubber and the brass. Up to now these phenomena were less understood and hardly controllable when using conventional brass-coated wires and cords in demanding rubber applications. Hence, considerable and unpredictable shortening of the running life of steel cord reinforced tires has been a serious drawback when such tires are exposed to severe humidity and heat ageing effects during operation. As distinguished from specific prior art proposals for either improving adhesion properties or brass protection against corrosion (which measures appeared to be less successful in increasing the aged adhesion retention to a satisfactory level, presumably because of the inability to slow down overcure/ageing reactions to a sufficient extent), the fundamental merit of the present invention consists both in the identification of the nature of the complex brass/rubber ageing problem and in the provision of an efficient and practical means for preventing otherwise excessive deterioration of adhesion strength under severe heat and/or humidity ageing circumstances.

The precise mechanism of the unexpectedly favorable phosphorus factor in this respect is not yet completely understood. We presume, that there may occur a direct beneficial effect of phosphorus, in particular of phosphate, for regulating/maintaining optimum brass reactivity in broadly varying ageing conditions, although this hypothesis should in no way be taken to limit the invention. Certain indirect factors related to brass phosphatization concern copper availability and mobility in the brass surface region (adjacent to the interface adhesion layer). As a result of phosphatization, copper migration from the coating interior to the reaction zone may be affected in such a way that excessive brass sulfidation and copper penetration in the rubber phase-structure is prevented. Minor changes in brass surface properties and composition (possibly as a result of interaction between phosphate, brass structure and high surface strain and shear forces experienced during wire drawing) may exert in additional favourable influence.

The present invention is applicable to a large variety of reinforcing steel elements covered by any suitable rubber adherable brass coating. However, the steel elements according to the invention are advantageously in the form of wires or cords for use in the reinforcement of tires and the following description is directed for the most part to brass-alloy coated steel wires and steel cords for this purpose, although not necessarily restricted thereto.

The invention is generally, but not exclusively, applicable to the commonly used combinations of steel wire materials and brass (i.e. Cu-Zn) alloy surface coatings employed for strengthening vulcanized rubber composites. Such wire materials conveniently have a diameter of less than 2 mm and are produced from carbon steels (most often high-carbon steel containing between 0.6 and 1.0 % C, although alloyed versions thereof with higher than normal Si and Mn-contents and/or containing Cr, Ni, Mo, V, Co, Nb, etc, are not to be excluded). The wire surface will be covered with a thin brass alloy coating containing at least 55 % Cu (most often a binary Cu-Zn alpha-brass alloy with 60 to 75% Cu). The P-containing brass coatings according to this invention optionally may also comprise other elements, e.g. one or more additional alloying elements (such as Co, Ni, Fe, Mn, Sn, Sb, Mo, etc.) added in varying minor amounts to the P-brass composition.

Particularly preferred embodiments of the present invention are concerned with brass alloy coated wires and cords for use in vehicle tires. Such wire materials are commonly made from brass-coated near-eutectoid steel up to about 1.0 % C (more often 0.7-0.85 % C), which following patenting, is brass plated and wet drawn to a final diameter of below 0.50 mm, commonly between 0.10 and 0.40 mm. In general, such hard drawn pearlitic wires having a tensile strength of about 2500-2800 $N/mm^2$, sometimes increased to up to more than 3000 $N/mm^2$. The wire surface is covered by a thin brass alloy coating containing from 58 to 75 % Cu, preferably from 60 to 72 % Cu. Coating thickness is generally less than 0.50 $\mu m$ and is preferably between 0.10 and 0.35 $\mu m$. The brass alloy coating may be formed by alloy plating (e.g. from a cyanidic electrolytic Cu-Zn solution) or by sequential plating (in any order) from separate copper and zinc baths to form distinct Cu and Zn-layers in appropriate proportions followed by a thermodiffusion treatment so as to achieve a homogeneous (usually α-brass) alloy layer composition.

In principle, any appropriate process (including chemical/electrochemicl electrochemical deposition and even physical alloying methods) can be used to achieve the desired P-containing brass composition of this invention and this can be realized at any suitable stage of the wire and cord manufacturing process. Thus, the alloying treatment with phosphorus, and in particular the provision of a required phosphate amount in the brass composition, may be realized in different ways. It can thus be carried out prior or together with the deposition of the brass coating on the wire surface (alloy plating or sequential Cu and Zn plating), or between sequential plating and thermodiffusion, or following thermodiffusion and prior to wire drawing, or also during the wire drawing process. It could also be done on finished wire filaments (either before or after twisting the wires into a tire cord). The manner or order in which these P-containing or phosphatized brass surface coatings are realized into wires and cords is not important to the performance per se of the present invention, but only to the degree of performance and ease of manufacturing.

According to a particularly preferred feature of the practice of the present invention, there is provided a method of producing a brass coated steel wire or steel cord covered by a desired phosphatized brass composition, which method comprises dipping a previously brass-coated steel wire in an appropriate phosphatizing solution so as to deposit a required amount of phosphate on the brassed wire surface, which phosphate upon subsequent wire drawing is evenly distributed into the brass layer by the combined effect of extreme thermoplastic surface straining, mechanical mixing and deformation enhanced migration or diffusion.

In a most preferred embodiment thereof a previously patented steel wire is first brass coated (either alloy plated or, more preferably sequentially plated with Cu+Zn and thermodiffused) and next treated in a phosphatizing $H_3PO_4$-solution of desired composition so as to fix a required phosphate-amount on the brass surface prior to drawing and finally subjected to a large deformation by drawing the same to a required final filament diameter.

The phosphoric acid solution may also contain zinc phosphates, one suitable phosphoric acid/zinc phosphate solution being that sold under the commercial name Bonderite 9 (supplied by Barker Chemicals, U.S.). The brassed wire is conveniently phosphatized by running through a bath of the desired solution and it is preferred to dry the wire between dipping and drawing, for instance by hot air drying or other convenient methods.

In the case of thermodiffused brass coatings, the phosphatizing treatment of the Cu-Zn deposit can also be carried out before thermodiffusion (i.e. on the upper Zn-layer of the Cu +Zn plating) with subsequent thermodiffusion so as to form a phosphate-containing brass alloy. Most preferred however is the process whereby a previously thermodiffused Cu-Zn coated wire is subjected to a phosphatizing treatment followed by wet drawing said wire to its final diameter with a large drawing reduction of up to 96 % and more.

According to another possible embodiment of the method of this invention, the improved wire with P-alloyed brass coating is obtained by submerged drawing of a brass-coated wire in a wet lubricant solution of a composition effective to phosphatize the brass layer to a sufficient degree during the multiple die wire diameter reduction operation. This process effects phosphatization of the brass surface and may also provide penetration of part of the phosphate deeper into the brass layer by the action of heavy surface deformation and high die pressure while leaving most of the phosphate in the upper layer of the brass coating.

The main advantages of the above identified preferred processes for producing steel filaments covered with a brass coating composition in accordance with this invention include simplicity of operation and favourable production economics.

In order to demonstrate the broad applicability of the present invention and the superior adhesion properties of wires and cords provided with a novel brass coating in accordance with the invention, and to appreciate the marked gain in adhesion retention over current brassed wires and cord used in comparable rubber and high humidity/heat ageing conditions, we have carried out an extensive test program with a multiplicity of cord-/rubber combinations involving various brass alloy coatings, different wire processing methods and several tire rubber compounds. In these investigations we used brass coated steel wires drawn to a filament diameter of 0.20 to 0.30 mm (made from 0.70 to 0.85 % C-steel). Cords of $1\times5$, $1\times4$, $2+2$, $3+9$, $2+7$ and $12\times1$ (compact cord) construction were twisted from said filaments (or normal strength and increased strength of up to more than $3000N/mm^2$) covered in most cases with a Cu-Zn alloy thermodiffusion coating having a copper content in range of 60 to about 72% and further containing a preset amount of phosphate which was varied from a very small level (nil to less than 3 $mg/m^2$) to increased levels of up to more than 30 $mg/m^2$.

Actual adhesion testing was carried out on vulcanized rubber samples wherein either brass-coated wires or cords were embedded. Static adhesion was then determined in the wellknown standard manner by measuring the force (in Newton) required to pull a test wire or cord through and out of a rubber block (with standard depth of wire/cord embedment of 1 to 2.5 cm) by using standard Instron testing machine.

For humidity/heat ageing the vulcanized rubber samples containing the embedded wires or cords were placed in a closed chamber containing a humid steam atmosphere at a temperature of 120° C. The samples were aged therein for a period of 12 to 24 hours. After this period of time, the samples were removed from the steam ageing chamber. Adhesion measurements for the unaged and steam aged samples were conducted at room temperature by using the above-described pull-out test.

The rubbers to which the treated and untreated wire or cord is to be bonded are preferably standard tire rubbers based on natural rubber and/or polyisoprene, suitably compounded with carbon black, sulphur, zinc oxide, accelerators, antioxidants, stearic acid, etc. In most cases we used proprietary and/or commercially available tire rubber compounds. However, blends thereof with other rubbery polymers (like butadiene-styrene copolymers, polybutadiene, etc.) can also be used and for products other than tires there can be used nitrile rubber, polychloroprene and similar mixtures.

The superior adhesion retention properties following steam ageing and the production of improved brass-coated wire and cord according to the invention is illustrated in the examples given below which explain the object and technical advantages of the present invention.

EXAMPLE 1

This example illustrates the capacity of the phosphatizing-drawing method for producing steel filaments with a specified P-containing brass coating according to the invention.

Steel wires were produced from patented and brass-coated halfproduct material of diameter 1.24 mm (0.72% C steel) by wet drawing the same to a diameter of 0.27 mm, the ultimate tensile strength of the wire attaining about 2700–2850 $N/mm^2$. The thermodiffused brass layer on the wire surface had a Cu-Zn alloy composition with 63 to 71 % Cu and a coating weight of about 3.5–4.5 g of brass per kg of wire. To investigate the filament adhesion response to the presence of phosphorus in the brass-alloy composition, the currently used wet lubricant solution was adapted with the aim of providing a desired degree of phosphatizing power varying from very poor (reference lubricant) to moderate and up to high. For this purpose the phosphate concentration in the lubricant was raised stepwise from a normal level (low total phosphate amount of less than 0.5 g/l) to a medium level of 1.2-2 g/l and was further increased to a high level ranging from 2 to 3 g/l. For more effective phosphatizing, the concentration of soluble phosphates was set at a value of at least 0.5 g/l and adjusted in a range of about 0.6 to 1 g/l for moderate phosphatizing, respectively from about 1 to 1.8 g/l for enhanced phosphatizing in combination with a control of pH (appropriate addition of $H_3PO_4$) and of the fatty acid (lubricating) compounds in the lubricant solution to compensate consumption of chemicals during operation.

The results obtained was brassed filaments drawn in varying phosphatizing-lubrication conditions were as follows:

TABLE 1

Coating characterization versus lubricant conditions.

| Phosphate content of lubricant g/l | Phosphating power of lubricant | Phosphorus content of coating (**) | |
|---|---|---|---|
| | | IR-reflection (Absorbance Units) × $10^3$ | Chemical analysis by DCP (mg/m²) |
| <0.5 to 1 | I. nil to low | 0.1-2 | <3 |
| 1-2 | II. moderate | 2-4 | 3-5 |
| >2 | III. moderate to high | 4-6.5 | 5-8 |
| >2 with predip | IV. high (*) | ≧6 up to 7.5-9 | ≧7 up to 9-10 |

(*) Highest P-concentrations (level IV) in the brass surface coating of the wet drawn wire were obtainable by passing the wire through a phosphoric acid predip bath (e.g. 3% $H_3PO_4$) placed at the entrance of the drawing machine with a drying stage between the predip bath and the drawing machine. Maximum $PO_4$-concentrations in the brass coating attainable by applying the method of phosphatizing in the drawing lubricant were about 8 to 10 mg/m².

(**) Phosphorus characterization of the coating is carried out by the infra-red reflection technique (IR) and by fine chemical analysis of the brass layer using the DCP (Atomic Emission Spectroscopy by Direct Current Plasma) method. The IR-technique mainly gives information on the P-content of the upper brass surface (IR-reflection peak at $PO_4$-wavelength of measured IR-spectrum). The amount of phosphate is expressed as absorbance units (A.U.) or relative reflection intensity $$\left( \Delta R = \frac{I_o - I}{I_o} \right)$$

The DCP-chemical analysis, by contrast, gives information on total phosphate content of the brass coating since the sample preparation method ensures in-depth leaching of phosphates present in the brass layer. This method was therefore adopted as the standard method of analysis and is referred to herein as the "Standard Test". The exact procedure is performed as follows: Standard preparation procedure for DCP-analysis in the case involves treatment of 5 gram cord or filament or other element, cut into bits, in a 1.2 N HCl solution (10 ml) for 60 seconds at ambient temperature in an ultrasonic bath (Telsonic type TUC-150, frequency 35 kHz) to speed up in-depth brass layer attack. The obtained solute is then transferred to a well-known DCP-instrument for analytical determination of $PO_4$-amount (Beckman Spectraspan VI; wavelength of DCP-spectrum: λ = 213.618 nm). This measured amount is then converted to give a value expressed as weight in milligram related to the brassed surface of the element in square meters (mg $PO_4$/m² of wire). The DCP-method has been found to be very reliable and reproducible and to afford precise data even when $PO_4$-content is very low. Therefore the method has been adopted as the Standard Test referred to herein.

The drawn wires with different P-contents of their brass surface coating, relating to the phosphatizing lubricative conditions I to IV of table I, were then incorporated into rubber blocks for comparative adhesion testing. Wire embedment length was 1 centimeter and vulcanization was carried out at 155° C. for a cure time of 35 minutes. The vulcanized rubber/cord samples were then subjected to steam ageing (120° C.-24 hours) for adhesion comparison with unaged samples. Static adhesion tests were conducted (as described hereinabove) by pulling the filaments through and out the rubber blocks by means of an Instron testing machine and by measuring the pull-out force in Newton. The test data are summarized in table 2.

TABLE 2

| Phosphatizing-drawing conditions of wire | Adhesion of wire filaments (force in Newton) | |
|---|---|---|
| | Unaged | Steam aged |
| I | ≧130 | 38-52 (poor) |
| II | (mostly greater | 51-65 |
| III | than breaking | 76-89 |
| IV | force of filaments) | 83-94 |

As demonstrated by the results given in Tables 1 and 2, adhesion retention of brassed filaments after steam ageing is markedly improved by providing the steel wire with a brass coating containing a sufficiently high phosphate amount (level III and IV) according to phosphatizing-drawing conditions. The phosphatizing-drawing method, however, has some limitations with regard to the maximum attainable phosphate amount of brass coating and requires great care to maintain a constant phosphatizing level in production conditions (ageing of lubricant solution).

In a second series of tests adhesion response of phosphatization was evaluated for commercial tire cords (construction type 2+2×0.25 mm) twisted from 0.25 mm diameter wires (tensile strength of about 2800-3000N/mm²) provided with a brass surface layer containing about 63-64 % Cu with a coating weight of about 3.4 g/kg of wire. Phosphorus content of the brass coating was set at either a high level (at least $4 \times 10^{-3}$ A.U. by IR-analysis), or alternatively at a normal low level ($0.1 \times 10^{-3}$ A.U.) by adapting the phosphatizing capacity of the wet drawing lubricant.

Adhesion results of rubberised cord samples after vulcanization or steam ageing are given in Table 3 below.

TABLE 3

| Phosphatizing level | Adhesion of (2 + 2 × 0.25) cords in commercial tire rubber compound | | |
|---|---|---|---|
| | Initial adhesion (Newton) | Steam-aged adhesion (Newton) with ageing time | |
| | | 12 hrs | 24 hrs |
| low (conventional wires) | 370-427 | 230-257 | 167-187 |
| high (wires of the invention) | 375-430 | 280-300 | 218-227 |

It can be seen that brass-coated cords of this investigation are less sensitive to adhesion degradation by steam ageing. Adhesion retention after 24 hours is improved by 20-25 % over conventional cords. However, as will be demonstrated in the following examples, the reliability of the method and the level of improvement in aged adhesion retention can be increased to a still more significant extent by optimization of the practice of this invention in accordance with the underlying inventive concept.

EXAMPLE 2

Brass-plated cords (2+2×0.25 mm) having an average brass coating thickness ranging between 0.12 and 0.30 μm with a copper content from about 60% up to 70% were twisted from 0.25 mm diameter wire. The wire had been drawn from brassed semiproduct (0.68 to 0.86% C; diameter 1.20 to 1.40 mm) which was thermodiffused to produce a homogeneous α-brass structure as desired for adequate wet drawing and rubber adhesion purposes.

In a first series (I) said plated wires were conventionally processed to a final diameter 0.25 mm without any special previous treatment of the brass coating.

In a second series (II) the thermodiffused brassed semiproducts, prior to drawing, were first subjected to a controlled phosphatizing treatment by immersion in a phosphoric acid solution (0.5 to 10% $H_3PO_4$) followed by careful heating/drying so as to obtain a sufficiently phosphatized brass coating. Wet drawing to 0.25 mm was carried out in the same lubricant as used for current production of conventional wires (cfr. series I).

Cord samples randomly taken from the two wire series were evaluated with respect to steam aged adhesion retention.

Phosphorus content (expressed as $PO_4^{3-}$) of cord filaments has been determined by DCP-analysis (the Standard Test).

Table 4 gives the results of coating characterization and adhesion behaviour in two unidentified standard time compounds supplied to use by well known tire manufactures.

pounds for steam ageing purposes, we observed a substantial increase in adhesion retention. Of course, the degree of improvement is affected by rubber composition and further depends on degree of coating perfection, wire processing and drawing care.

A schematic representation of the improvement in adhesion retention after steam ageing is shown in FIG. 1, comparing actual levels of current tire cords with the results achieved by applying the cords and production method according to this invention.

EXAMPLE 3

In this example we investigated the steam aged adhesion response of 0.25 mm filaments and cords (2+2)×0.25 mm with different settings of phosphate amount in their brass plate. Phosphate content was determined by chemical DCP-analysis (the Standard Test). Copper content of the thermodiffused brass coating was between 60.5 and 66% and coating weight varied from about 2.8 g up to 5 g per kg of wire filament.

In a first set-up phosphatization of the brassed semiproduct was carried out by a predip bath (20 to 50 g/l of phosphoric acid) with rapid drying prior to and in

TABLE 4

Initial and steam aged adhesion (Newton) of 2 + 2 × 0.25 mm cords with brass coatings of different P-content (expressed as phosphate)

| | Compound A | | | | | Compound B | | |
|---|---|---|---|---|---|---|---|---|
| | Adhesion (N) | | Brass Coating | | P-content | Adhesion (N) | | Brass coating |
| Wire type | Init. | Steam-ageing 24 H - 120° C. | % Cu | Weight g/kg | tent mg/m² | Init. | Steam ageing 24 H 120° C. | P-content mg/m² |
| I | 433 | 210 | 69.5 | 4.15 | 1.6 | 476 | 182 | 1.9 |
| current | 477 | 243 | 66.7 | 3.45 | 3.1 | 474 | 220 | 2.8 |
| to low | 466 | 248 | 64.9 | 3.38 | 2.9 | 450 | 232 | 2.9 |
| P-level | 475 | 252 | 60.8 | 4.30 | 2.7 | 465 | 201 | 3.2 |
| II | 450 | 308 | 68.8 | 3.80 | 15.2 | 480 | 277 | 10.1 |
| invention | 477 | 317 | 66.3 | 3.21 | 7.4 | 460 | 270 | 10.4 |
| (phos- | 495 | 372 | 63.5 | 3.03 | 11.1 | 445 | 288 | 8.5 |
| phatized | 483 | 313 | 65.2 | 3.24 | 7.8 | 400 | 290 | 9.3 |
| | 471 | 298 | 61.6 | 3.52 | 4.6 | 428 | 261 | 5.7 |
| III | 457 | 172 | 63.9 | 3.9 | 2.1 | | | |
| current | 446 | 187 | 62.5 | 4.3 | 2.7 | | | |
| mass | 450 | 153 | 66.1 | 5.4 | 1.9 | | | |
| production | 442 | 139 | 69.2 | 4.9 | 1.7 | | | |

As demonstrated by the tabulated results, a substantial improvement in adhesion retention is obtainable in a reproducible way by assembling cords from filaments having a brass composition with an specified P-content, which according to the invention is at least 4 mg $PO_4$ per m² of brassed wire surface.

Most remarkable is also the finding of an unexpected, considerable improvement (70 up to 90 %) over current production levels of steam aged cord adhesion.

On filament, specified phosphate levels are preferably at least 5 mg/m² and more preferably in a range of from 7 up to more than 25 mg/m².

It can be seen that by applying the teachings of the present invention in optimum practice conditions, a high retained adhesion target value of 280N after 24 hours of steam-ageing is achievable in different rubbers. Even in rubber batches showing 20 to 30% lower initial adhesion ratings than the most appropriate rubber comline with the entering section of the wire drawing machine. In a second better controlled and adjustable process the semi-product brass coating line was extended with an appropriate phosphatizing and phosphate fixing cell wherein the brass coated wire was treated in appropriate conditions ($H_3PO_4$-concentration from 5 to up to more than 250g/l, preferably from 25 to 125 g/l; zinc orthophosphate concentration from zero up to the solubility limit; different immersion times) with the aim of systematically increasing the phosphate content of the brassed wire (firmly attached to brass layer by proper drying/heating).

Steam aged adhesion retention (120° C.-24 hrs) of wire and cord samples was evaluated in 2 distinct batches of a given tire rubber compound stemming from the same supplier. The results are summarized in Table 5.

TABLE 5

Adhesion force (Newton) versus PO$_4$—content of wire and cord specimens following steam ageing.

| Specimen type | PO$_4$—content mg/m$^2$ | batch 1 filament | batch 1 cord | batch 2 filament | batch 2 cord |
|---|---|---|---|---|---|
| normal production | 1.2–2.9 | 19–34 | 144–167 | 31–37 | 153–187 |
| phosphatizing predip | 3.1–3.9 | 39–52 | 192–223 | 46–58 | 230–262 |
| phosphatized on brass coating line | 4.0–5.0 | 50–58 | 238–265 | 57–65 | 250–302 |
| | 5.2–8.1 | 60–72 | 273–308 | 66–75 | 287–324 |
| | 9.2–12.8 | 71–86 | 293–328 | 85–92 | 330–342 |
| | 14–20 | 90–99 | 366–391 | 91–106 | 370–398 |
| | 23–28 | 86–94 | 345–369 | 89–96 | 355–370 |
| | 32–41 | 81–89 | 309–351 | 83–91 | 317–360 |

The tabulated results demonstrate the considerable improvement in adhesion retention after steam ageing obtainable by covering the wires or cords with a phosphatized brass coating comprising a specified minimum PO$_4$-amount of 4 mg/m$^2$ according to the invention. It can be seen that beyond an optimum PO$_4$-range (above about 25–30 mg/m$^2$) there is a slight tendency to somewhat lower than maximum adhesion values. In this respect, however, processing care, drawing conditions (lubricant type and temperature; number of dies and die series) and rubber compound factors will also affect actual adhesion response; said factors may shift the optimum PO$_4$-range to smaller or larger levels, or broaden or narrow it from case to case.

It can be seen that the improvement in aged adhesion retention obtainable by the invention is still significant at elevated PO$_4$-levels of up to more than 40 mg/m$^2$, although less pronounced and showing more variation as compared to the optimum PO$_4$-range. Thus, excessive increase of a PO$_4$-amount (about 40–50 mg/m$^2$ and more) is generally unnecessary for the purpose of adequate adhesion properties and often less desirable in practice owing to certain problems in wire production associated with drawability variations, increasing drawing losses and the like.

EXAMPLE 4

Experiments were made similar to those in example 3 with brassed cords (2+2)×0.25 mm but the rubber compound used for cord embedment was changed to check the comparative (steam) age adhesion response of different rubbers to the presence of phosphate in the brass coating.

In Table 6 a comparison is given between three unidentified standard industrial tire rubbers (as made available by well-known suppliers B, C and D) which were reinforced with conventional cords or alternatively cords according to the invention comprising on average between 10 and 15 mg/m$^2$ of PO$_4$ in their brass surface coating.

TABLE 6

Adhesion property of cords according to the invention versus conventional cords in different rubbers Cord Adhesion Strength in Newton

| Rubber | Conventional Cords Initial | Conventional Cords Steam Aged | Cords acc. to invention Initial | Cords acc. to invention Steam Aged |
|---|---|---|---|---|
| B | 492 | 271 | 493 | 357 |
| C | 423 | 243 | 446 | 349 |
| D | 438 | 201 | 450 | 360 |

In the following Table 7 the tests are repeated for rubbers B and C, but comprising brassed cords with varying phosphate amount in an usual brass composition of about 65 Cu—35 Zn.

TABLE 7

Effect of increasing PO$_4$-content of brass coating on cord adhesion in rubber C and D (steam ageing : 120° C. - 24 hours)

| Compound C PO$_4$-content of brass (mg/m$^2$) | Adhesion Strength Initial (N) | Adhesion Strength Steam aged 24 hrs-120° C. (N) | Compound D PO$_4$-content of brass | Adhesion strength Initial | Adhesion strength Steam aged |
|---|---|---|---|---|---|
| ≦3.0 | 403 | 243 | ≦3.0 | — | 185–204 |
| 4.0–4.8 | 420 | 310 | 3.9–4.5 | — | 229–244 |
| 7.1 | 437 | 322 | 6.1 | — | 260–293 |
| 10.4 | 457 | 342 | 10.8 | — | 320 |
| 15.2 | 445 | 360 | 14.6 | — | 379 |
| 16.9 | 468 | 375 | 17.5 | — | 391 |
| 21.6 | 485 | 413 | 19 | — | 366 |
| 31 | 416 | 302 | 27.4 | — | 335 |

The test results (Table 7) demonstrate that a phosphatecontaining brass coating of this invention is very effective in different commercial rubbers to considerably enhance adhesion retention of normal cords in steam ageing conditions. As expected, the attainable degree of improvement and the optimum PO$_4$-range depend on the rubber compound.

In a further series of tests we investigated the peculiar adhesion effect of certain special rubber ingredients (known as adhesion promotors and often optionally added to a given standard rubber mix) in combination with the phosphate factor.

We started with a standard compound S having the following base composition (main ingredients expressed as relative weight units):
Natural rubber: 100
Carbon black: 60
Zinc oxide: 8
Sulfur: 4
Stearic Acid: 0.5
Other proprietary additives:
Santoflex 13 (Monsanto): 2
Dutrex 729: 6
Santocure MOR (Monsanto): 0.8
Flectol: 1

Compound S was modified by replacement of part of the carbon black with the well known HRH or RFS system, and additionally small quantities of three well known adhesion promoters were added, to give modified compositions as follows:

| Ingredients | S1 | S2 | S3 | S4 |
|---|---|---|---|---|
| Carbon black | 45 | 45 | 45 | 45 |
| RFS { Ultrasil VN 13 | 12.5 | 12.5 | 12.5 | 12.5 |
| Cofill II | 5 | 5 | 5 | 5 |
| Hexa K | — | — | 1.5 | 1.5 |
| Cyrez resin 963 | 4 | 4 | — | — |
| Manobond C16 | 1.5 | — | — | 1.5 |
| Addivex Co 23% | — | 1 | 1 | — |

Suppliers : Manobond C-16: Mancham Ltd. Manchester Addivex Co 23% : Ets.Vasset, Ezamville, France Cyrez resin: American Cyanamid, New Jersey, U.S.

Conventional brassed cords and cords according to the invention with a brass surface comprising from 8 to 20 mg $PO_4$ per $m^2$ were incorporated in said rubbers for adhesion testing after vulcanization (initial adhesion) and steam ageing (120° C.-24 hrs).

TABLE 8

| | Cord Adhesion in modified rubbers Adhesion strength in Newton | | | |
|---|---|---|---|---|
| Rubber | Conventional Cords | | Cords acc. to invention | |
| Compound | Initial | Steam Aged | Initial | Steam Aged |
| S | 495 | 157 | 490 | 279 |
| S1 | 481 | 304 | 489 | 436 |
| S2 | 491 | 336 | 485 | 438 |
| S3 | 492 | 140 | 493 | 303 |
| S4 | 488 | 168 | 492 | 376 |

From the tabulated adhesion ratings it is clear that cords according to the invention systematically retain a significantly higher cord-to-rubber bond level than conventional tire cords under similar steam ageing conditions, and this for all the tested rubber modifications.

Comparing the different additives, it can be seen that the Cyrez adhesion promotor is apparently more effective for steam ageing than a HRH-type. However, this in no way diminishes the general conclusion that a phosphate-containing brass coating according to the invention affords a very substantial improvement of cord-/rubber adhesion in severe heat/humidity ageing conditions irrespective of the applied tire rubber compound.

EXAMPLE 5

Similar to example 4 the same cord construction (2+2)×0.25 mm comprised of respectively conventionally produced filaments with normal brass coating and of filaments made according to the invention (drawn from prephosphatized brassed wire) were incorporated in various rubbers to investigate the adhesion properties under (overcure) heat ageing conditions. Adhesion response upon heat ageing was determined by subjecting cord/rubber samples to prolonged vulcanization cure cycles at 155° C. and then measuring the adhesion strength (cord pull-out force in Newton).

Table 9 summarizes the results obtained in commercial rubber C of example 4.

TABLE 9

| | Adhesion strength vs. cure time | | | | |
|---|---|---|---|---|---|
| | $PO_4$-content of brass coating, $mg/m^2$ | | | | |
| | Current Cords | Intermediate cords | Cords according to invention | | |
| Cure time (minutes) | < 3 | 3–4 | 7,6 | 14 | 18,2 |
| 15 | 333 | 417 | 350 | 390 | 410 |
| 25 | 448 | 482 | 472 | 492 | 440 |
| 35 | 475 | 465 | 463 | 475 | 495 |

TABLE 9-continued

| | Adhesion strength vs. cure time | | | | |
|---|---|---|---|---|---|
| | $PO_4$-content of brass coating, $mg/m^2$ | | | | |
| | Current Cords | Intermediate cords | Cords according to invention | | |
| Cure time (minutes) | < 3 | 3–4 | 7,6 | 14 | 18,2 |
| 60 | 403 | 422 | 447 | 462 | 462 |
| 180 | 345 | 360 | 407 | 415 | 447 |
| 200 | | | | | |

Similar tests were carried out on modified rubbers S1, S2, S3 and S4 of Example 4 reinforced with normal cords and cords according to the invention. Here the cord-/rubber blocks were heat aged for 200 minutes at 155° C. The results are set out in Table 10 as follows :

TABLE 10

| | Overcure adhesion retention (Newton) | |
|---|---|---|
| Rubber Compound | Improved Cords | Conventional Cords |
| S1 | 417 | 305 |
| S2 | 450 | 422 |
| S3 | 473 | 418 |
| S4 | 452 | 373 |

From the results it follows that improved cords with a phosphate-containing brass coating according to the invention are consistently superior to normal cord in their resistance to adhesion degradation as a result heat ageing (overcure). The improvement is systematically observed in a variety of rubbers although the degree of performance well depend on rubber type and on optimization of a $PO_4$-containing brass composition.

Some typical results are illustrated in FIG. 2 described hereinabove.

EXAMPLE 6

To evaluate other important advantages of the present invention (and also to distinguish between the humidity and heat factors in the humidity/heat ageing problem) we carried out additional tests in cured humidity ageing conditions. For this purpose vulcanized cord/rubber blocks were prepared from the same conventional cords and cords according to the invention of Example 5 and exposed in a humidity chamber for 8 days to a temperature of 80° -85° C. and an atmosphere of 95% relative humidity.

Table 11 gives a comparison of initial and cured humidity adhesion for both cord types embedded in rubbers S1 to S4.

TABLE 11

| | Effect of humidity ageing on cord adhesion (Adhesion strength in Newton) | | | |
|---|---|---|---|---|
| | Current Cords | | Cords acc. to invention | |
| Rubber Compound | Initial | Cured Humidity | Initial | Cured Humidity |
| S1 | 481 | 363 | 489 | 465 |
| S2 | 491 | 382 | 485 | 471 |
| S3 | 492 | 140 | 493 | 314 |
| S4 | 488 | 175 | 492 | 324 |

The tabulated results clearly demonstrate the remarkable capacity of cords according to the invention to retard adhesion loss by humidity ageing.

Finally, a complementary test was carried out to separate the heat and humidity effects in steam ageing conditions. In this case we compared the adhesion response of cord/rubber samples upon ageing for 24 hours at 120° C. in a closed chamber comprising an atmosphere of respectively wet steam and dry nitrogen.

The results are summarized below for conventional cords and cords according to the invention incorporated in rubber compound S.

TABLE 12

| | Adhesion strength (Newton) after heat ageing (24 hours - 120° C.) | | |
|---|---|---|---|
| | | Heat Aged | |
| Cord Type | Initial Adhesion | Steam | Nitrogen |
| Conventional | 462 | 127 | 238 |
| Invention | 483 | 283 | 352 |

It can be seen that both the heat and humidity ageing part of the adhesion loss are considerably smaller when using cords according to the invention which proves the outstanding capacity of the invention to improve adhesion retention in different ageing conditions involving varying relative heat and humidity effects.

In summary, as seen from the examples and the results shown in the tables above, steel filaments and cords treated according to the invention and provided with a specified phosphate-containing brass surface coating for bonding to rubber ensure durable adhesion with rubber in service. In particular, adhesion retention in widely varying heat and/or humidity ageing conditions are markedly improved in different tire rubber compounds.

It has to be understood that the invention and the underlying inventive concept are not restricted to the generally known combination of steel elements and brass surface coatings used for reinforcing rubber with adequate bond strength. With respect to the selection of a reinforcing material, any alloyed steel, including non-ferrous metals and alloys, may be combined with rubber in any suitable form (such as filaments, cords, flat wire and other shaped elements and fabrics thereof) and provide improved adhesion properties if said elements are covered with a phosphate-containing brass layer.

In addition to the exemplified phosphatizing methods and the preferred embodiments of (Zn, Cu) phosphate-containing brass surface coatings for improving rubber to steel (cord) vulcanization bond properties, the invention may be extended to modified phosphatizing methods and other phosphorus compounds (pyrophosphate, phosphides) and possibly other P-alloying means to realize a desired P-containing brass coating. Modified phosphatizing methods may for example include depositing a metallic film (selected from Zn, Fe, Mn or a combination thereof) onto the brass surface and chemically converting said surface film into phosphate by treating the same in a phosphating bath.

To form a desired phosphated film on brassed wire prior to drawing a final filament, a chemical conversion treatment in a phosphoric acid solution containing metallic zinc ions, or optionally manganese or iron or iron and calcium ions to modify the metal composition of the phosphate film, may if desired be made. Nickel and/or cobalt phosphates may similarly be incorporated into the brass coating if desired. Also electrochemical aids and the use of electrolytic deposition are not excluded.

We claim:

1. A rubber adherable steel reinforcement element having a brass alloy coating consisting essentially of a substantially homogeneous Cu-Zn composition that has an essentially alpha-brass structure, which contains incorporated therein phosphorus, in the form of phosphate ions, in an amount of from 5 to 50 mg of phosphate ions per square meter of coating surface, wherein said phosphorus in said brass alloy coating serves to provide an enhanced adhesion to vulcanized rubber products upon heat and/or humidity aging.

2. A steel element as claimed in claim 1, wherein said amount of phosphate ions is from 6 to 40 mg per m$^2$.

3. A steel element as claimed in claim 2, wherein said amount of phosphate ions is from 8 to 30 mg/m$^2$.

4. A steel element as claimed in claim 3, wherein said amount of phosphate ions is from 10 to 25 mg/m$^2$.

5. A steel element as claimed in claim 1 wherein the brass alloy coating is one which has been applied by sequential plating of copper and zinc on to the steel element followed by thermodiffusion to form a substantially homogeneous coating of the brass alloy.

6. A steel element as claimed in claim 1 wherein the brass alloy coating is one which has been applied by alloy plating.

7. A steel element as claimed in claim 1 in the form of a steel wire.

8. A steel element as claimed in claim 7 in the form of a steel wire having a diameter of not more than 0.5 mm, a tensile strength of at least 2500 N/mm$^2$ and a brass alloy coating having a thickness of from 0.10 to 0.40 micrometer.

9. A steel cord for use as a tire reinforcing element which comprises a plurality of steel wires as claimed in claim 8.

10. A steel cord as claimed in claim 9 wherein the steel wires have a diameter of between 0.1 and 0.4 mm and a tensile strength of at least 2700N/mm$^2$.

11. A rubber tire comprising steel cords as claimed in claim 10 as reinforcements.

12. A rubber tire comprising steel cords as claimed in claim 9 as reinforcements.

13. Vulcanized rubber articles containing as reinforcements steel elements as claimed in claim 1.

14. A method of producing a rubber adherable steel reinforcement element in the form of a coated steel wire, comprising the steps of:
  (1) contacting the surface of a steel wire, having coated thereon a substantially homogeneous Cu-Zn composition that has an essentially alpha-brass structure, with a phosphatizing composition consisting essentially of phosphate ions;
  (2) fixing said phosphate on said brass coating; and
  (3) drawing the phosphatized wire, whereby phosphate ions are distributed in said brass coating, wherein the concentration of phosphate in said phosphatizing composition and the amount of phosphate fixed on said brass coating are such that phosphate ions are incorporated into said coating in an amount of from 5 to 50 mg of phosphate ions per square meter of coating surface after drawing.

15. The process of claim 14, wherein said phosphatizing composition comprises H$_3$PO$_4$ in a concentration of from 5 to 200 g/l.

16. The process of claim 15, wherein said phosphatizing composition further comprises zinc phosphate in a concentration up to its solubility limit.

17. A method as claimed in claim 14, wherein, in step (2), the wire is dried to fix said phosphate on said brass coating.

* * * * *